Oct. 23, 1962  R. R. RASMUSSEN  3,059,957
TRAILER TIRE
Filed May 5, 1960

INVENTOR.
Robert R. Rasmussen,
BY Parker & Carter
Attorneys.

3,059,957
TRAILER TIRE
Robert R. Rasmussen, 4927 W. Crain, Skokie, Ill.
Filed May 5, 1960, Ser. No. 27,116
2 Claims. (Cl. 295—8.5)

This invention relates to vehicle supporting elements and has particular relation to a tire for truck trailers and the like.

One purpose of the invention is to provide a tire for the wheels of truck trailers which enable the trailer to operate, with equal ease, on the highway and on the tracks of a railroad.

While an expected use of the invention would apply to truck trailers, it will be realized that the tire of the invention might be used to facilitate the movement of vehicles of many different forms and configurations with equal ease upon the highway and upon the tracks of a railroad.

Efforts of the past to provide means permitting movement of vehicles on both the tracks of a railroad and upon ordinary roads and highways have been directed toward the provision of complicated structure providing pneumatic or other types of tires for the highway and metallic or solid rubber wheel portions for supporting contact on the tracks of a railroad.

It is, accordingly, one purpose of the invention to provide a single supporting element for the movement of the vehicle on both the highway and the tracks of a railroad.

Another purpose of the invention is to provide a single element effective to support a vehicle in motion on a highway and on the tracks of railroad, which element shall be of maximum simplicity and economy in materials and manufacture.

Other purposes will appear from time to time during the course of the specification and claims.

I illustrate my invention more or less diagrammatically in the accompanying drawing, wherein.

Figure 1:
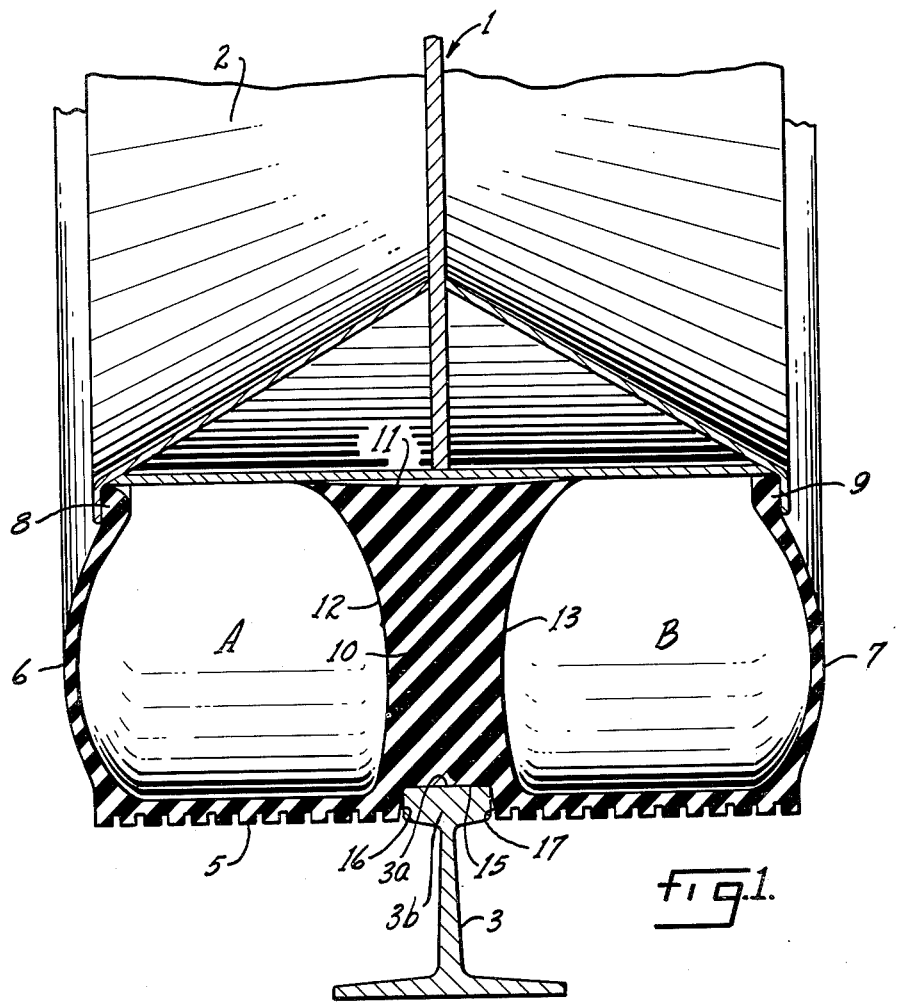
FIGURE 1 is a rear elevation in partial cross-section.

Like parts are indicated by like numerals throughout the specification and claims.

Referring now to the drawing, the numeral 1 generally indicates, in a diagrammatic sense, the wheel of a vehicle such as a truck trailer or the like. The numeral 2 indicates the rim of the wheel 1 which may take a variety of forms, a simplified form of rim being illustrated for disclosure purposes.

Indicated at 3 is a portion of a rail such as is normally employed in a railroad track.

The tire comprising my invention has a circumferential tread surface illustrated at 5, at the opposite ends of which are annular tire sidewalls 6 and 7 each bearing at their inner circular ends the beads 8, 9, respectively.

Intermediate the ends of the tread surface 5 and equidistant from the sidewalls 6, 7, is a massive central annular wall 10 formed, as are the sidewalls 6, 7, integrally with the tread surface 5, and defining, with the sidewalls 6, 7, annular fluid pressure receiving chambers A and B. The central mass 10 has an inner dished wall surface 11 positioned for contact with the rim 2 along its edges in substantial alignment with the beads 8, 9 when the rim 2 is of the substantially straight-line configuration illustrated, the depression shown at 11 being of aid in absorbing shocks experienced in movement.

The massive annular tire portion 10 may have its annular sidewalls 12, 13 curved, as illustrated, it being understood that the wall surfaces 12, 13, may be substantially straight without departing from the nature and scope of the invention.

Formed in the tread surface 5, intermediate the ends thereof, and in alignment with the center line of tire portion 10, is a groove 15 having a width substantially equal to the upper surface 3a of rail 3. The sidewalls 16, 17 of groove 15 may be outwardly flared to a slight degree to provide for ease of acceptance of upper portion 3b of rail 3, the depth of groove 15 being substantially equal to the thickness of rail upper portion 3b.

Figure 2:
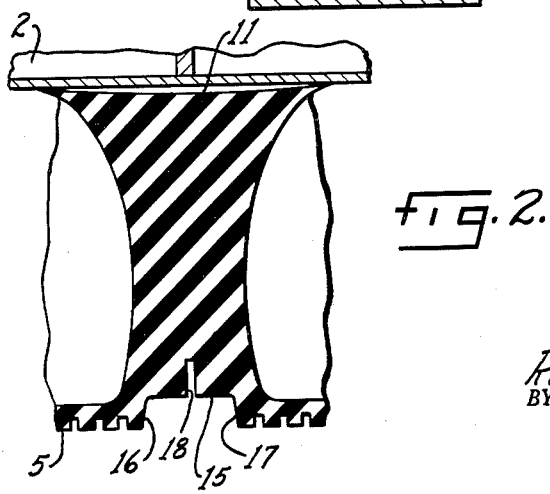
FIGURE 2 is a detailed view illustrating a variant form of an element of the invention.

An annular groove 18 may be formed in the circumferential bottom wall of groove 15 as indicated in FIGURE 2 to ease the stress exerted at the juncture of the sidewalls of groove 15 with the bottom wall thereof.

The use and operation of my invention are as follows:

When the vehicle on which the tire of my invention is employed, is moved along the highway, or any flat road surface, the tread portion 5 is effective, in a normal manner, for contact with the highway surface and to resiliently support the vehicle thereon. Such vehicle may, when the occasion arises, be driven from a flat surface in which rails, such as the rail 3, are imbedded, as for example in a railroad-highway intersection, onto the rails of a railroad track with the grooves 15 in the tires of my invention receiving the upper portions 3b of the rails 3 of such a railroad track.

Thereupon, as the vehicle is moved along the railroad track, the massive tire portion 10 is effective to support the vehicle, the rail 3, portion 10 and wheel 1 all being in vertical alignment.

It will be understood that various auxiliary means may be employed to facilitate the use of the tire of my invention, as above described. For example, relatively strong I-beams, or the like, may be found necessary to run beneath truck trailers, when the same employ the tire of the invention, in order to transmit the forces involved in a railroad engine drawing a plurality of such truck trailers along a railroad track. Such interconnected I-beams, provided for the purpose of receiving and transmitting the tensions and forces thus involved, may also be effective in retaining alignment of grooves 15 and rail portions 3b when the tread surfaces 5 are brought momentarily into contact with cross-rails or angularly intersecting rails of a railroad track. Such I-beams, and perhaps auxiliary devices, may also be employed in retaining such vehicles against lateral forces imparted thereto as such vehicles encounter curves in a railroad track.

Whereas I have described and illustrated a practical and operative device, nevertheless, many changes may be made in the size, shape, number and disposition of parts without departing from the spirit of my invention. For example, the massive, solid rubber, or solid-tire material, of portion 10 may vary in thickness or in general configuration without departing from the nature and scope of the invention, it being only necessary that the tire of my invention have such an immediate massive solid integral portion and a groove 15 in alignment with wheel 1 and extending from tread surface 5 to rim 2. I therefore wish my description and drawings to be taken as in a broad sense illustrative or diagrammatic, rather than as limiting me to my precise showing.

I claim:

1. A vehicle tire having a circumferential tread surface, a pair of integral annular sidewalls secured to the opposite edges of said tread surface, a massive integral central wall positioned intermediate the edges of said tread surface and equidistant from the inner surfaces of said sidewalls, said central wall defining with said sidewalls a pair of spaced annular fluid pressure receiving chambers, said massive central wall having a width substantially greater than said sidewalls together and an outwardly open generally rectilinear circumferential groove formed in said tread surface intermediate the edges thereof, said groove having a pair of spaced annular outwardly flared sidewalls and a second generally rectilinear circumferential groove formed centrally therein, said last mentioned second circumferential groove being of substantially less width than said first mentioned circumferential groove.

2. A vehicle tire having a circumferential tread surface, a pair of integral annular sidewalls secured to the opposite edges of said tread surface, a massive integral central wall positioned intermediate the edges of said tread surface and equidistant from the inner surfaces of said sidewalls, said central wall defining with said sidewalls a pair of spaced annular fluid pressure receiving chambers, said massive central wall having a minimum width substantially greater than said sidewalls, the radial inner edge of said central wall being substantially wider than the radial outer edge thereof, said inner edge having a concave cylindrical surface, an outwardly open generally rectilinear circumferential groove formed in said tread surface intermediate the edges thereof, said groove having a width less than the minimum width of said central wall, said groove having a pair of spaced, annular, outwardly flared sidewalls, the bottom of said groove having formed centrally therein a second, generally rectilinear circumferential groove of substantially lesser width than said first mentioned groove.

References Cited in the file of this patent

UNITED STATES PATENTS

| | | |
|---|---|---|
| 745,040 | Cooper | Nov. 24, 1903 |
| 782,155 | Maxon | Feb. 7, 1905 |
| 1,642,504 | Miller | Sept. 13, 1927 |
| 2,105,860 | Hurska | Jan. 18, 1938 |
| 2,785,017 | Noyes | Mar. 12, 1957 |
| 2,990,869 | Riley | July 4, 1961 |

FOREIGN PATENTS

| | | |
|---|---|---|
| 27,727 | Great Britain | 1909 |
| 660,009 | Great Britain | Oct. 31, 1951 |
| 467,045 | Germany | Oct. 18, 1928 |